US009357398B2

(12) United States Patent
Nakamura et al.

(10) Patent No.: US 9,357,398 B2
(45) Date of Patent: May 31, 2016

(54) RADIO BASE STATION, RADIO COMMUNICATION SYSTEM, AND CONTROL METHOD

(75) Inventors: Kazutaka Nakamura, Yokohama (JP);
Chiharu Yamazaki, Tokyo (JP); Taku Nakayama, Yamato (JP); Shingo Joko, Kawasaki (JP); Yoshimasa Kusano, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 163 days.

(21) Appl. No.: 13/700,122

(22) PCT Filed: May 27, 2011

(86) PCT No.: PCT/JP2011/062278
§ 371 (c)(1),
(2), (4) Date: Nov. 26, 2012

(87) PCT Pub. No.: WO2011/149083
PCT Pub. Date: Dec. 1, 2011

(65) Prior Publication Data
US 2013/0072201 A1 Mar. 21, 2013

(30) Foreign Application Priority Data
May 27, 2010 (JP) ................................. 2010-122143

(51) Int. Cl.
*H04W 40/00* (2009.01)
*H04W 36/00* (2009.01)
(Continued)

(52) U.S. Cl.
CPC .............. *H04W 16/08* (2013.01); *H04W 36/22* (2013.01); *H04W 72/0426* (2013.01); *H04W 72/0486* (2013.01); *H04W 92/20* (2013.01)

(58) Field of Classification Search
CPC ............................. H04W 16/08; H04W 72/04
USPC .......................................................... 455/445
See application file for complete search history.

(56) References Cited

U.S. PATENT DOCUMENTS

2004/0229621 A1* 11/2004 Misra ............................ 455/445
2005/0143052 A1* 6/2005 Pradhan et al. ............ 455/414.1
(Continued)

OTHER PUBLICATIONS

3GPP TR 36.902 V9.0.0 (Sep. 2009); 3rd Generation Partnership Project; Technical Specification Group Radio Access Network; Evolved Universal Terrestrial Radio Access Network (E-UTRAN); Self-configuring and self-optimizing network use cases and solutions (Release 9).
(Continued)

*Primary Examiner* — Lester Kincaid
*Assistant Examiner* — Andy Gu
(74) *Attorney, Agent, or Firm* — Studebaker & Brackett PC

(57) ABSTRACT

A radio base station (eNB1), which is used in a radio communication system that can autonomously adjust, based on load information transmitted/received between radio base stations, the radio base station parameters used for defining coverage, comprises: a network communication unit (140) that can receive, from another radio base station, first load information indicating the load level of the other radio base station and that can transmit, to the other radio base station, a request for transmission of second load information the information amount of which is greater than that of the first load information; and a control unit (120) that, when the load level of the other radio base station indicated by the received first load information satisfies a given condition, controls such that the request for transmission of the second load information is transmitted to the other radio base station.

5 Claims, 4 Drawing Sheets

(51) Int. Cl.
  *H04W 16/08* (2009.01)
  *H04W 36/22* (2009.01)
  *H04W 72/04* (2009.01)
  *H04W 92/20* (2009.01)

(56) References Cited

U.S. PATENT DOCUMENTS

2008/0005043 A1* 1/2008 Reblin et al. .................. 705/410
2008/0242301 A1* 10/2008 Osterling et al. .............. 455/436
2009/0137251 A1* 5/2009 Ji et al. .......................... 455/437
2009/0310568 A1* 12/2009 Chen et al. .................... 370/332

OTHER PUBLICATIONS

3GPP TR 36.902 V9.1.0 (Mar. 2010); 3rd Generation Partnership Project; Technical Specification Group Radio Access Network; Evolved Universal Terrestrial Radio Access Network (E-UTRAN); Self-configuring and self-optimizing network (SON) use cases and solutions (Release 9).
3GPP TS 36.423 V9.2.0 (Mar. 2010); 3rd Generation Partnership Project; Technical Specification Group Radio Access Network; Evolved Universal Terrestrial Radio Access Network (E-UTRAN); X2 application protocol (X2AP) (Release 9).
International Search Report; PCT/JP2011/062278; Jul. 26, 2011.

* cited by examiner

RADIO BASE STATION, RADIO COMMUNICATION SYSTEM, AND CONTROL METHOD

TECHNICAL FIELD

The present invention relates to a radio base station, a radio communication system, and a control method using a SON technique.

BACKGROUND ART

In LTE (Long Term Evolution) standardized in 3GPP (3rd Generation Partnership Project) which is a standardization organization for radio communication systems, there are applied SON (Self Organizing Network) techniques in which a radio base station itself autonomously adjusts its own parameters (referred to below as base station parameters) without human intervention (see Non-Patent Document 1, for example).

As one of the SON techniques, there is proposed a method by which base station parameters (such as handover parameters) defining coverage are adjusted according to load information exchanged between radio base stations in order to balance loads between the radio base stations. Such an optimization technique is referred to as MLB (Mobility Load Balancing). Note that coverage means a logical or physical communication area of a radio base station.

Specifically, in an LTE system, the following four classes of load information are defined (see Non-Patent Document 2). (a) Usage of PRB5 (Physical Resource Blocks) being units for time-frequency resource allocation, (b) load of backhaul between a radio base station and a core network, (c) hardware load of a radio base station, and (d) capacity class being an index of relative communication capacity of a radio base station, and a ratio of available communication capacity to the communication capacity.

PRIOR ART DOCUMENT

Non-Patent Document

Non-Patent Document 1: 3GPP TR36. 902 "SON use cases and solutions"
Non-Patent Document 2: 3GPP TS36. 423 "X2 application protocol (X2AP)"

SUMMARY OF THE INVENTION

In MLB, the above four classes of load information are assumed to be exchanged between radio base stations. However, if all of these classes of information are exchanged between the radio base stations, the amount of load information exchanged between the radio base stations becomes large. As a result, such a large amount of load information sent through transmission paths between the radio base stations may lead to congestion in the transmission paths.

On the other hand, if only one class of the four classes of load information is fixedly exchanged, it is difficult to estimate the overall state of loads, so that loads may fail to be balanced appropriately between radio base stations.

Hence, an objective of the present invention is to provide a radio base station, a radio communication system, and a control method capable of appropriately balancing loads between radio base stations, while suppressing the amount of load information sent through transmission paths between the radio base stations.

In order to solve the problem described above, the present invention has features below.

First of all, a feature of a radio base station according to the present invention is summarized as follows. A radio base station (radio base station eNB1) used in a radio communication system capable of autonomously adjusting a base station parameter defining coverage according to load information exchanged between radio base stations, comprises: a receiver (network communication unit 140) configured to receive first load information (e.g. Hardware Load Indicator) indicating a load level of a different radio base station (radio base station eNB2) from the different radio base station; a transmitter (network communication unit 140) capable of transmitting a transmission request for second load information (e.g. Radio Resource Status and/or Composite Available Capacity Group) having a larger information amount than the first load information to the different radio base station; and a controller (controller 120) configured to control the transmitter so that the transmission request for the second load information is transmitted to the different radio base station, when the load level of the radio base station and the load level of the different radio base station indicated by the first load information received by the receiver satisfy a certain condition.

According to the radio base station, the radio base station firstly makes a comparison by use of first load information of a small information amount, and then requests second load information of large information amounts depending on a result of the comparison. Thus, as a result of using the first load information of a small information amount, a comparison can be made using the second load information only when a more detailed comparison is necessary.

Accordingly, loads between radio base stations can be balanced appropriately while suppressing the amount of load information sent through the communication path between the radio base stations.

Another feature of the radio base station according to the present invention is summarized as follows. In the radio base station according to the aforementioned feature, the certain condition is that the load level of the radio base station is higher than the load level of the different radio base station indicated by the first load information received by the receiver; the receiver receives the second load information from the different radio base station after the transmitter transmits the transmission request for the second load information; and the controller performs control to reduce coverage of the radio base station by adjusting the base station parameter, when the load level of the radio base station is higher than the load level of the different radio base station indicated by the second load information received by the receiver.

Another feature of the radio base station according to the present invention is summarized as follows. In the radio base station according to the aforementioned feature, the certain condition is that the load level of the radio base station is lower than the load level of the different radio base station indicated by the first load information received by the receiver; the receiver receives the second load information from the different radio base station after the transmitter sends the transmission request for the second load information; and the controller performs control to expand coverage of the radio base station by adjusting the base station parameter, when the load level of the radio base station is lower than the load level of the different radio base station indicated by the second load information received by the receiver.

Another feature of the radio base station according to the present invention is summarized as follows. In the radio base station according to the aforementioned feature, the first load information indicates a hardware load level of the different radio base station.

Another feature of the radio base station according to the present invention is summarized as follows. In the radio base station according to the aforementioned feature, the second load information indicates at least one of: information on an amount of radio resource used by the different radio base station, and information on a capacity class being an index of relative communication capacity of the different radio base station and on a ratio of available communication capacity to the communication capacity.

A feature of a radio communication system according to the present invention is summarized as follows. A radio communication system capable of autonomously adjusting a base station parameter defining coverage according to load information exchanged between radio base stations, comprises a first radio base station and a second radio base station, wherein the first radio base station comprises: a receiver configured to receive first load information indicating a load level of the second radio base station from the second radio base station; a transmitter capable of transmitting a transmission request for second load information having a larger information amount than the first load information to the second radio base station; and a controller configured to control the transmitter so that the transmission request for the second load information is transmitted to the second radio base station, when a load level of the radio base station and a load level of the different radio base station indicated by the first load information received by the receiver satisfy a certain condition. When the second radio base station receives the transmission request for the second load information from the first radio base station after transmitting the first load information to the first radio base station, the second radio base station transmits the second load information to the first radio base station.

A feature of a control method according to the present invention is summarized as follows. A control method for a radio base station used in a radio communication system capable of autonomously adjusting a base station parameter defining coverage according to load information exchanged between radio base stations, comprises the steps of: receiving first load information indicating a load level of a different radio base station from the different radio base station; and transmitting a transmission request for second load information having a larger information amount than the first load information to the different radio base station, when the load level of the radio base station and the load level of the different radio base station indicated by the first load information received in the receiving step satisfy a certain condition.

DESCRIPTION OF THE EMBODIMENTS

A description is given of embodiments of the present invention with reference to the drawings. To be specific, descriptions are given of (1) outline of radio communication system, (2) configuration of radio base station, (3) operation of radio communication system, (4) effects and advantages, and (5) other embodiments. In the following description of the drawings in the embodiments, same or similar reference signs denote same or similar portions.

(1) Outline of Radio Communication System

Firstly, a description is given of a radio communication system of this embodiment in the order of (1.1) overall schematic configuration, and (1.2) concrete examples of load information.

(1.1) Overall Schematic Configuration

Figure 1:
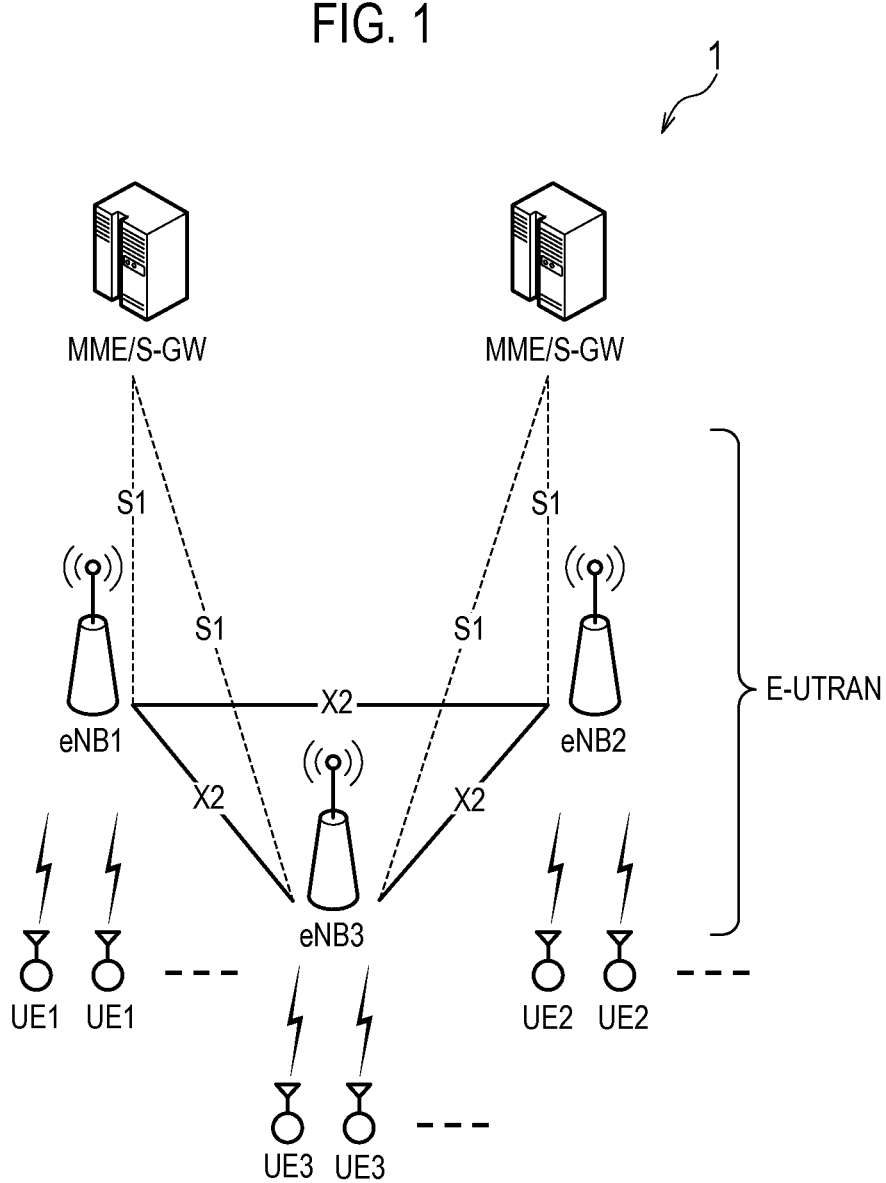
FIG. 1 is a schematic view showing a configuration of a radio communication system of an embodiment of the present invention.

FIG. 1 is a view showing a configuration of a radio communication system 1 of this embodiment. The radio communication system 1 is configured according to LTE standards.

As shown in FIG. 1, multiple radio base stations eNB (radio base stations eNB1 to eNB3) form an E-UTRAN (Evolved-UMTS Terrestrial Radio Access Network). Each of the multiple radio base stations eNB forms a cell which is a communication area for providing a service to radio terminals UE.

Adjacent radio base stations eNB can communicate via an X2 interface being a logical communication path providing inter-base station communication. Each of the multiple radio base stations eNB can communicate with an EPC (Evolved Packet Core), namely, an MME (Mobility Management Entity)/ S-GW (Serving Gateway) via an S1 interface.

A radio terminal UE is a radio communication device held by a user, and is also referred to as user equipment. Multiple radio terminals UE1 connect to the radio base station eNB1 in a cell formed by the radio base station eNB1. Multiple radio terminals UE2 connect to the radio base station eNB2 in a cell formed by the radio base station eNB2. Multiple radio terminals UE3 connect to the radio base station eNB3 in a cell formed by the radio base station eNB3.

The radio terminal UE is configured to measure quality of a radio signal (i.e., radio quality) received from the radio base station eNB, and send a report on the result of measurement of radio quality (measurement report) to the connecting radio base station eNB. Here, radio quality refers to a reference signal received power (RSRP), for example. A measurement report may be sent from the radio terminal UE to the radio base station eNB by using an event set by the radio base station eNB as a trigger, or may be periodically sent from the radio terminal UE to the radio base station eNB.

The radio base station eNB to which the radio terminal UE connects performs handover control in which a connection destination of the radio terminal UE is switched according to a measurement report received from the radio terminal UE. In a case where the radio terminal UE receives reference signals from multiple radio base stations eNB, the measurement report may include multiple RSRPs of the multiple radio base stations. The radio base station eNB to which the radio terminal UE connects performs control according to the measurement report, so that the radio terminal UE may connect to a radio base station eNB having the highest RSRP among the multiple radio base stations eNB, for example.

The radio communication system 1 supports aforementioned MLB. In this embodiment, each of the radio base stations eNB adjusts a handover parameter as a base station parameter defining coverage, according to load information exchanged between the radio base stations eNB. For example, when a load of the radio base station eNB1 is higher than a load of the radio base station eNB2 (or eNB3), the radio base stations eNB adjust the handover parameters so that coverage of the radio base station eNB1 can be reduced and coverage of the radio base station eNB2 (or eNB3) can be expanded.

In this embodiment, this handover parameter is an offset value for correcting the RSRP measured by the radio terminal UE. For example, assume a case where the radio terminal UE1 can receive radio signals from both of the radio base station eNB1 and the radio base station eNB2. Here, before comparing an RSRP (referred to below as RSRP1) of the radio base station eNB1 and an RSRP (referred to below as RSRP2) of the radio base station eNB2, an offset value for correcting RSRP1 to a higher value is added to RSRP1. This makes it more likely for the offset RSRP1 to exceed the RSRP2. Accordingly, the radio base station eNB1 is preferentially selected as the connection destination (handover destination), and thus coverage of the radio base station eNB1 is expanded. Note that in order to avoid unnecessary handovers, one offset value is set for each pair of radio base stations eNB, and the value is shared between the paired radio base stations eNB.

Hereinbelow, a description is given mainly of a case where handover parameters are adjusted between the radio base station eNB1 and the radio base station eNB2.

(1.2) Concrete Examples of Load Information

In the radio communication system 1, the following classes of load information are exchanged via the X2 interface between adjacent radio base stations eNB. The load information-reception side can select a class of load information and request the load information-transmission side to send the load information via the X2 interface.

Here, classes of load information include four classes including (a) Radio Resource Status, (b) S1 TNL Load Indicator, (c) Hardware Load Indicator, and (d) Composite Available Capacity Group. While details of these classes of load information are described in Non-Patent Document 2, an outline of these classes of load information is given below.

Radio Resource Status indicates the usage of PRB5 (Physical Resource Blocks) being units for time-frequency resource allocation. More specifically, Radio Resource Status indicates: the usage of PRB5 for guaranteed bitrate traffic in Downlink and Uplink; the usage of PRB5 for non-guaranteed bitrate traffic; and the total usage of PRB5. In this embodiment, Radio Resource Status corresponds to second load information.

S1 TNL Load Indicator is the load of backhaul (S1 interface) between the radio base station eNB and a core network, and each of loads in Downlink and Uplink is indicated by one of four indicators low load, medium load, high load, and overload.

Hardware Load Indicator is hardware (such as a CPU) load of the radio base station eNB, and each of loads in Downlink and Uplink is indicated by one of four indicators low load, medium load, high load, and overload. In this embodiment, Hardware Load Indicator corresponds to first load information.

Composite Available Capacity Group indicates a capacity class being an index of relative communication capacity of a radio base station, and a ratio of available communication capacity (in Downlink and Uplink) to the communication capacity. In this embodiment, Composite Available Capacity Group corresponds to second load information.

Each of Hardware Load Indicator and S1 TNL Load Indicator only shows one of four indicators low load, medium load, high load, and overload for Downlink and Uplink, and thus has a small information amount. On the other hand, Radio Resource Status indicates the usage of PRB5 for guaranteed bitrate traffic in Downlink and Uplink, the usage of PRB5 for non-guaranteed bitrate traffic, and the total usage of PRB5, and thus has a large information amount. Similarly, Composite Available Capacity Group may take any of numerous values, and thus has a large information amount.

(2) Configuration of Radio Base Station

Figure 2:
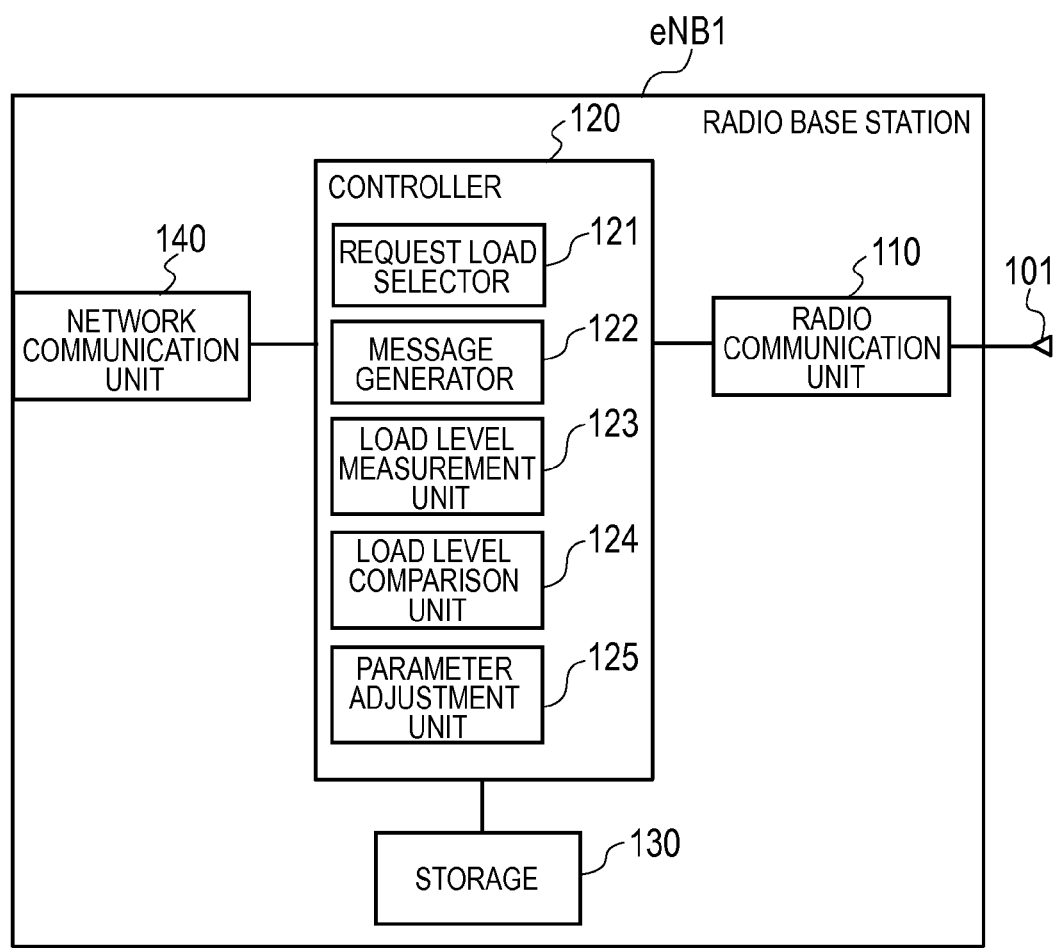
FIG. 2 is a block diagram showing a configuration of the radio communication system of the embodiment of the present invention.

Next, a description is given of a configuration of the radio base station eNB1. FIG. 2 is a block diagram showing a configuration of the radio base station eNB1.

As shown in FIG. 2, the radio base station eNB1 includes an antenna unit 101, a radio communication unit 110, a controller 120, a storage 130, and a network communication unit 140.

The radio communication unit 110 is formed of a radio frequency (RF) circuit, a baseband (BB) circuit and the like, for example, and is configured to exchange radio signals with the radio terminal UE1 via the antenna unit 101. In addition, the radio communication unit 110 is configured to modulate and encode transmission signals, as well as to demodulate and decode reception signals.

The controller 120 is formed of a CPU, for example, and is configured to control various functions of the radio base station eNB1. The storage 130 is formed of a memory, for example, and is configured to store therein various information used for control and the like of the radio base station eNB1. The network communication unit 140 is configured to perform inter-base station communication using the X2 interface, and communication using the S1 interface.

The controller 120 includes a request load selector 121, a message generator 122, a load level measurement unit 123, a load level comparison unit 124, and a parameter adjustment unit 125.

The request load selector 121 is configured to select a class of load information to request transmission from the radio base station eNB2 being the load information-transmission side. In addition, the request load selector 121 generates Report Characteristics being information indicating the selected class.

The message generator 122 is configured to generate a Resource Status Request message for requesting transmission of load information, and a Mobility Change Request message for requesting a change in the handover parameter. The Resource Status Request message and the Mobility Change Request message are sent to the radio base station eNB2 by the network communication unit 140.

A Resource Status Request message includes Report Characteristics generated by the request load selector 121, and information indicating a transmission cycle of load information. Upon receipt of a Resource Status Request message, the radio base station eNB2 sends a Resource Status Response message being a positive response, or a Resource Status Failure message being a negative response, as will be described below. In a case of accepting the Resource Status Request message, the radio base station eNB2 sends Resource Status Update messages including load information in the transmission cycle included in the Resource Status Request message. At this time, the radio base station eNB2 sends load information of a class indicated by Report Characteristics included in the Resource Status Request message. The network communication unit 140 is configured to periodically receive Resource Status Response messages from the radio base station eNB2.

The load level measurement unit 123 is configured to measure its own load level (i.e., load level of the radio base station eNB1). The load level measurement unit 123 may be configured to measure the load level only of the class selected in the aforementioned Report Characteristics.

The load level comparison unit 124 is configured to compare its own load level measured by the load level measurement unit 123, and a load level of the radio base station eNB2 indicated by load information received by the network communication unit 140. The load level comparison unit 124 makes a comparison every time the network communication unit 140 receives a Resource Status Update message.

The parameter adjustment unit 125 is configured to adjust the handover parameter according to a result of comparison made by the load level comparison unit 124.

To be specific, the parameter adjustment unit 125 adjusts the handover parameter to expand its coverage when its corrected load level is lower than the load level of the radio base station eNB2. For example, the parameter adjustment unit 125 increases an offset value to be added to an RSRP of its own radio base station eNB1, or reduces an offset value to be added to an RSRP of the radio base station eNB2 to thereby make spurious expansion of its coverage.

Moreover, the parameter adjustment unit 125 adjusts the handover parameter to reduce its coverage when its corrected load level is higher than the load level of the radio base station eNB2. For example, the parameter adjustment unit 125 reduces the offset value to be added to the RSRP of its own radio base station eNB1, or increases the offset value to be added to the RSRP of the radio base station eNB2 to thereby make spurious reduction of its coverage.

Note that the parameter adjustment unit 125 needs to be permitted by the radio base station eNB2 to adjust the handover parameter. For this reason, the parameter adjustment unit 125 notifies the radio base station eNB2 of the corrected handover parameter by a Mobility Change Request message, and adjusts the handover parameter only when it is confirmed that the corrected handover parameter is accepted.

(3) Operation of Radio Communication System

Hereinafter, descriptions are given of operation patterns 1 and 2 of the radio communication system 1. The operation pattern 1 is an operation for reducing coverage of the radio base station eNB1, and the operation pattern 2 is an operation for enlarging coverage of the radio base station eNB1. Although the operation pattern is divided into two for convenience of the description, it should be noted that the operation patterns 1 and 2 can be appropriately used depending on the situation.

(3.1) Operation Pattern 1

Figure 3:
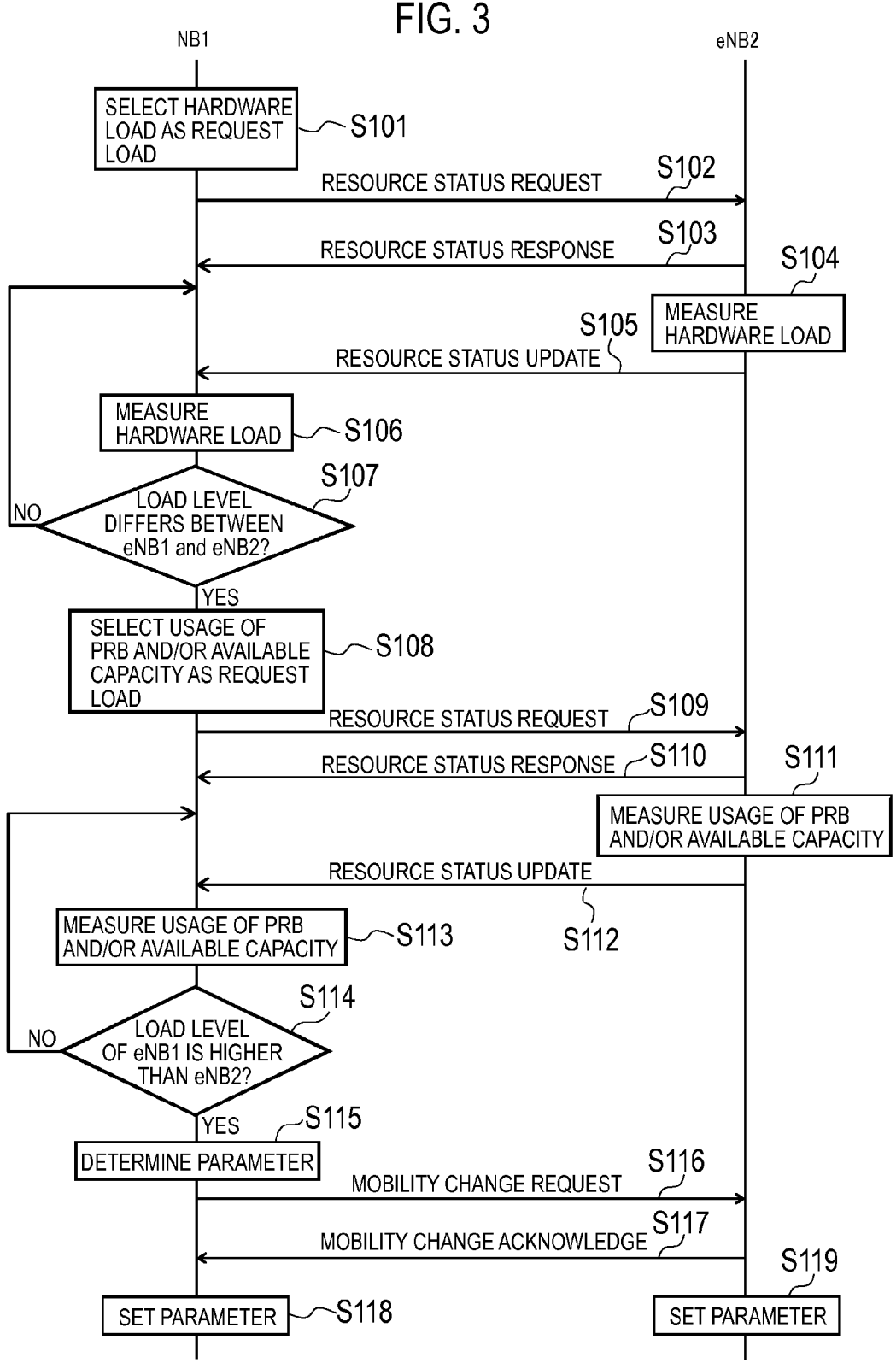
FIG. 3 is an operation sequence chart showing an operation pattern 1 of the radio communication system of the embodiment of the present invention.

FIG. 3 is an operation sequence chart showing the operation pattern 1 of the radio communication system 1.

In step S101, the request load selector 121 selects Hardware Load Indicator as a class of load information to request transmission from the radio base station eNB2 being the load information-transmission side. The request load selector 121 generates Report Characteristics indicating that Hardware Load Indicator is selected.

In step S102, the message generator 122 of the radio base station eNB1 generates a Resource Status Request message including Report Characteristics generated by the request load selector 121. Moreover, the network communication unit 140 sends the Resource Status Request message generated by the message generator 122 to the radio base station eNB2. The radio base station eNB2 receives the Resource Status Request message.

In step S103, in a case of accepting the Resource Status Request message, the radio base station eNB2 sends a Resource Status Response message to the radio base station eNB1. The network communication unit 140 of the radio base station eNB1 receives the Resource Status Response message.

In step S104, the radio base station eNB2 measures a load level of a class indicated by Report Characteristics included in the Resource Status Request message, which, in this case, is its hardware load level (hardware load level of the radio base station eNB2). Note that the processing of step S104 may be performed between steps S102 and S103.

In step S105, the radio base station eNB2 sends a Resource Status Update message including Hardware Load Indicator indicating the hardware load level to the radio base station eNB1. The network communication unit 140 of the radio base station eNB1 receives the Resource Status Update message including Hardware Load Indicator.

In step S106, the load level measurement unit 123 of the radio base station eNB1 measures a hardware load level as its load level. Note that the processing of step S106 may be performed before step S105.

In step S107, the load level comparison unit 124 of the radio base station eNB1 compares its hardware load level measured by the load level measurement unit 123 and the hardware load level of the radio base station eNB2 indicated by Hardware Load Indicator received by the network communication unit 140. When the hardware load level of the radio base station eNB2 and the own hardware load level are the same (step S107: NO), the handover parameter is in an optimized state of a certain level, and thus current adjustment of the handover parameter is omitted and the processing returns to step S104. Hereinbelow, a description is given of a case where the hardware load level of the radio base station eNB1 is higher than the hardware load level of the radio base station eNB2.

When the hardware load level of the radio base station eNB1 is higher than the hardware load level of the radio base station eNB2 (step S107: YES), in step S108, the request load selector 121 of the radio base station eNB1 selects Radio Resource Status and/or Composite Available Capacity Group as a class of load information to request transmission from the radio base station eNB2. The request load selector 121 generates Report Characteristics to the effect that Radio Resource Status and/or Composite Available Capacity Group is selected.

In step S109, the message generator 122 of the radio base station eNB1 generates a Resource Status Request message including Report Characteristics generated by the request load selector 121. Moreover, the network communication unit 140 sends the Resource Status Request message generated by the message generator 122 to the radio base station eNB2. The radio base station eNB2 receives the Resource Status Request message.

In step S110, in a case of accepting the Resource Status Request message, the radio base station eNB2 sends a Resource Status Response message to the radio base station eNB1. The network communication unit 140 of the radio base station eNB1 receives the Resource Status Response message.

In step S111, the radio base station eNB2 measures a load level of a class indicated by Report Characteristics included in the Resource Status Request message, which, in this case, is its time-frequency resource load level (time-frequency resource load level of the radio base station eNB2). Specifically, if Radio Resource Status is selected, the radio base station eNB2 measures the usage of PRBs for guaranteed bitrate traffic in Downlink and Uplink, the usage of PRBs for non-guaranteed bitrate traffic, and the total usage of PRBs. Meanwhile, if Composite Available Capacity Group is selected, the radio base station eNB2 measures the ratio of available communication capacity in Downlink and Uplink. Note that the processing of step S111 may be performed between steps S109 and S110.

In step S112, the radio base station eNB2 sends a Resource Status Update message including Radio Resource Status and/or Composite Available Capacity Group to the radio base station eNB1. The network communication unit 140 of the radio base station eNB1 receives the Resource Status Update message including Radio Resource Status and/or Composite Available Capacity Group.

In step S113, the load level measurement unit 123 of the radio base station eNB1 measures its time-frequency resource load level as its load level. To be specific, if Radio Resource Status is selected, the load level measurement unit 123 measures the usage of PRBs for guaranteed bitrate traffic in Downlink and Uplink, the usage of PRBs for non-guaranteed bitrate traffic, and the total usage of PRBs. Meanwhile, if Composite Available Capacity Group is selected, the load level measurement unit 123 measures the ratio of available communication capacity in Downlink and Uplink.

In step S114, the load level comparison unit 124 of the radio base station eNB1 compares its hardware load level measured by the load level measurement unit 123 and the hardware load level of the radio base station eNB2 indicated by Radio Resource Status and/or Composite Available Capacity Group received by the network communication unit 140. When the hardware load level of the radio base station eNB1 is lower than the hardware load level of the radio base station eNB2 (step S114: NO), the processing returns to step S111 (or step S101).

When the hardware load level of the radio base station eNB1 is higher than the hardware load level of the radio base station eNB2 (step S114: YES), in step S115, the parameter adjustment unit 109 determines an adjusted handover parameter. Here, the parameter adjustment unit 109 determines the adjusted handover parameter so that coverage of the radio base station eNB1 is reduced.

In step S116, the message generator 122 generates a Mobility Change Request message including the adjusted handover parameter, and the network communication unit 140 sends the Mobility Change Request message to the radio base station eNB2. The radio base station eNB2 receives the Mobility Change Request message.

In step S117, in a case of accepting the Mobility Change Request message, the radio base station eNB2 sends a Mobility Change Acknowledge message to the radio base station eNB1.

In steps S118 and S119, the radio base station eNB1 and the radio base station eNB2 set adjusted handover parameters.

Thus, in the operation pattern 1, the controller 120 performs control so that the network communication unit 140 can send a transmission request for Radio Resource Status and/or Composite Available Capacity Group to the radio base station eNB2, when its hardware load level is higher than the hardware load level indicated by Hardware Load Indicator received by the network communication unit 140. Then, the controller 120 performs control to reduce its coverage by adjusting the handover parameter, when its time-frequency resource load level is higher than the time-frequency resource load level indicated by Radio Re source Status and/or Composite Available Capacity Group received by the network communication unit 140.

(3.2) Operation Pattern 2

Figure 4:
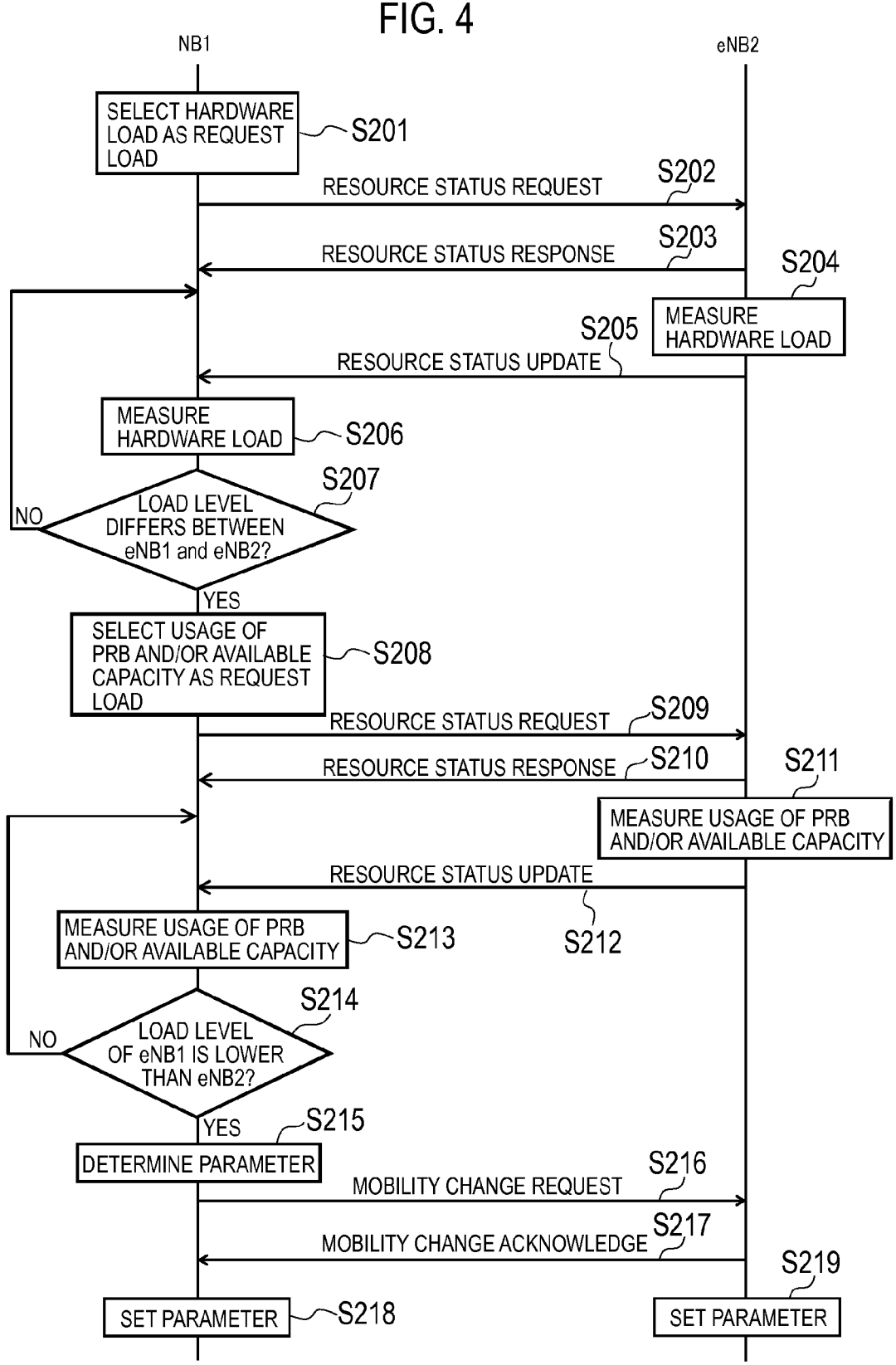
FIG. 4 is an operation sequence chart showing an operation pattern 2 of the radio communication system of the embodiment of the present invention.

FIG. 4 is an operation sequence chart showing an operation pattern 2 of the radio communication system 1.

In step S201, the request load selector 121 selects Hardware Load Indicator as a class of load information to request transmission from the radio base station eNB2 being the load information-transmission side. The request load selector 121 generates Report Characteristics to the effect that Hardware Load Indicator is selected.

In step S202, the message generator 122 of the radio base station eNB1 generates a Resource Status Request message including Report Characteristics generated by the request load selector 121. Moreover, the network communication unit 140 sends the Resource Status Request message generated by the message generator 122 to the radio base station eNB2. The radio base station eNB2 receives the Resource Status Request message.

In step S203, in a case of accepting the Resource Status Request message, the radio base station eNB2 sends a Resource Status Response message to the radio base station eNB1. The network communication unit 140 of the radio base station eNB1 receives the Resource Status Response message.

In step S204, the radio base station eNB2 measures a load level of a class indicated by Report Characteristics included in the Resource Status Request message, which, in this case, is its hardware load level (hardware load level of the radio base station eNB2). Note that the processing of step S204 may be performed between steps S202 and S203.

In step S205, the radio base station eNB2 sends a Resource Status Update message including Hardware Load Indicator to the radio base station eNB1. The network communication unit 140 of the radio base station eNB1 receives the Resource Status Update message including Hardware Load Indicator.

In step S206, the load level measurement unit 123 of the radio base station eNB1 measures a hardware load level as its load level. Note that the processing of step S206 may be performed before step S205.

In step S207, the load level comparison unit 124 of the radio base station eNB1 compares its hardware load level measured by the load level measurement unit 123 and the hardware load level of the radio base station eNB2 indicated by Hardware Load Indicator received by the network communication unit 140. When the hardware load level of the radio base station eNB2 and the own hardware load level are the same (step S207: NO), the handover parameter is in an optimized state of a certain level, and thus current adjustment of the handover parameter is omitted and the processing returns to step S204. Hereinbelow, a description is given of a case where the hardware load level of the radio base station eNB1 is lower than the hardware load level of the radio base station eNB2.

When the hardware load level of the radio base station eNB1 is lower than the hardware load level of the radio base station eNB2 (step S207: YES), in step S208, the request load selector 121 of the radio base station eNB1 selects Radio Resource Status and/or Composite Available Capacity Group as a class of load information to request transmission from the radio base station eNB2. The request load selector 121 generates Report Characteristics to the effect that Radio Resource Status and/or Composite Available Capacity Group is selected.

In step S209, the message generator 122 of the radio base station eNB1 generates a Resource Status Request message including Report Characteristics generated by the request load selector 121. Moreover, the network communication unit 140 sends the Resource Status Request message generated by the message generator 122 to the radio base station eNB2. The radio base station eNB2 receives the Resource Status Request message.

In step S210, in a case of accepting the Resource Status Request message, the radio base station eNB2 sends a Resource Status Response message to the radio base station eNB1. The network communication unit 140 of the radio base station eNB1 receives the Resource Status Response message.

In step S211, the radio base station eNB2 measures a load level of a class indicated by Report Characteristics included in the Resource Status Request message, which, in this case, is its time-frequency resource load level (time-frequency resource load level of the radio base station eNB2).

In step S212, the radio base station eNB2 sends a Resource Status Update message including Radio Resource Status and/or Composite Available Capacity Group to the radio base station eNB1. The network communication unit 140 of the radio base station eNB1 receives the Resource Status Update message including Radio Resource Status and/or Composite Available Capacity Group.

In step S213, the load level measurement unit 123 of the radio base station eNB1 measures its time-frequency resource load level as its load level.

In step S214, the load level comparison unit 124 of the radio base station eNB1 compares its hardware load level measured by the load level measurement unit 123 and the hardware load level of the radio base station eNB2 indicated by Radio Resource Status and/or Composite Available Capacity Group received by the network communication unit 140. When the hardware load level of the radio base station eNB1 is higher than the hardware load level of the radio base station eNB2 (step S214: NO), the processing returns to step S211 (or step S201).

When the hardware load level of the radio base station eNB1 is lower than the hardware load level of the radio base station eNB2 (step S214: YES), in step S215, the parameter adjustment unit 109 determines an adjusted handover parameter. Here, the parameter adjustment unit 109 determines the adjusted handover parameter so that the coverage of the radio base station eNB1 is expanded.

In step S216, the message generator 122 generates a Mobility Change Request message including the adjusted handover parameter, and the network communication unit 140 sends the Mobility Change Request message to the radio base station eNB2. The radio base station eNB2 receives the Mobility Change Request message.

In step S217, in a case of accepting the Mobility Change Request message, the radio base station eNB2 sends a Mobility Change Acknowledge message to the radio base station eNB1.

In steps S218 and S219, the radio base station eNB1 and the radio base station eNB2 set adjusted handover parameters.

Thus, in the operation pattern 2, the controller 120 performs control so that the network communication unit 140 can send a transmission request for Radio Resource Status and/or Composite Available Capacity Group to the radio base station eNB2, when its hardware load level is lower than the hardware load level indicated by Hardware Load Indicator received by the network communication unit 140. Then, the controller 120 performs control to expand its coverage by adjusting the handover parameter, when its time-frequency resource load level is lower than the time-frequency resource load level indicated by Radio Resource Status and/or Composite Available Capacity Group received by the network communication unit 140.

(4) Effects and Advantages

As has been described, the radio base station eNB1 firstly makes a comparison by use of Hardware Load Indicator of a small information amount, and then requests for Radio Resource Status and/or Composite Available Capacity Group of large information amounts depending on a result of the comparison. Thus, as a result of using Hardware Load Indicator of a small information amount, a comparison can be made using Radio Resource Status and/or Composite Available Capacity Group only when a more detailed comparison is necessary. Accordingly, loads between radio base stations can be balanced appropriately while suppressing the amount of load information sent through the X2 interface.

In addition, Radio Resource Status and Composite Available Capacity Group indicate radio resource (frequency resource and time resource) load, whereas Hardware Load Indicator indicates hardware load. Since hardware load has a large adverse impact on communication performance of the radio base station eNB, hardware load is the load information that should be considered most important among the above four classes. Since comparison using aforementioned Hardware Load Indicator is essential in this embodiment, it is possible to prevent deterioration in communication performance of the radio base station eNB. Then, after making the comparison on hardware loads, a comparison is made on radio resource (time-frequency resource) loads, whereby the overall state of loads in the radio base stations eNB can be estimated, and loads can be balanced more appropriately between the radio base stations.

(5) Other Embodiments

Hereinabove, the present invention has been described by using the embodiments. However, it should not be understood that the description and drawings which constitute part of this disclosure limit the present invention. From this disclosure, various alternative embodiments, examples, and operation techniques will be easily found by those skilled in the art.

Although a description has been given in the above embodiment of a case where Hardware Load Indicator is used as the first load information of a small information amount, S1 TNL Load Indicator of about the same information amount as Hardware Load Indicator may be used as the first load information instead.

Although an offset value is described as a handover parameter in the above embodiment, a handover threshold compared with an RSRP may be adjusted instead of the offset value. Moreover, instead of adjusting the handover parameter, other base station parameters (such as an antenna tilt angle or a transmission power) may be adjusted to physically change coverage.

The description of the above embodiment has been given of a radio communication system according to LTE (3GPP Release 8 or 9). However, in LTE Advanced (3GPP Release 10) of improved LTE, provision of a heterogeneous network including multiple types of radio base stations having different transmission powers is scheduled. The present invention is also applicable to such a heterogeneous network. Moreover, in LTE Advanced, provision of a relay node being a radio base station forming backhaul by radio waves is also scheduled. Such a relay node may also be used as the radio base station of the present invention.

Furthermore, although the above embodiment has been described using an LTE system, the present invention is also applicable to other radio communication systems such as a radio communication system according to mobile WiMAX (IEEE 802.16e).

Hence, it should be understood that the present invention includes various embodiments which are not described herein.

Note that the entire content of Japanese Patent Application No. 2010-122143 (filed on May 27, 2010) is incorporated herein by reference.

INDUSTRIAL APPLICABILITY

As has been described, the radio base station, the radio communication system, and the control method of the present invention are capable of appropriately balancing loads between radio base stations while suppressing the amount of load information sent through transmission paths between the radio base stations, and thus are useful in radio communication such as mobile communication.

The invention claimed is:

1. A radio base station used in a radio communication system capable of autonomously adjusting a base station parameter defining coverage according to load information exchanged between radio base stations, comprising:
   a controller configured to request a first load information indicating a hardware load level of a different radio base station;
   a receiver configured to receive the first load information from the different radio base station:
   wherein the controller is further configured to compare the load level of the different radio base station indicated by the first load information to the load level of the radio base station,
   a transmitter configured to transmit a transmission request for a second load information in response to a result the comparison of the load level of the radio base station with the load level of the different radio base station indicated by the first load information, wherein the second load information is configured to have a larger information amount than the first load information;
   wherein the receiver is further configured to receive the second load information from the different radio base station after the transmitter transmits the transmission request for the second load information;
   and wherein the controller is configured to control to reduce coverage of the radio base station by adjusting the base station parameter based on the second load information received by the receiver.

2. The radio base station according to claim 1, wherein:
   the load level of the radio base station is lower than the load level of the different radio base station indicated by the first load information received by the receiver;
   the receiver receives the second load information from the different radio base station after the transmitter sends the transmission request for the second load information; and
   the controller performs control to expand coverage of the radio base station by adjusting the base station parameter, when the load level of the radio base station is lower than the load level of the different radio base station indicated by the second load information received by the receiver.

3. The radio base station according to claim 1, wherein the second load information further indicates:
   information on a capacity class being an index of relative communication capacity of the different radio base station and on a ratio of available communication capacity to the communication capacity in addition to the time-frequency resource load level used by the different radio base station.

4. A radio communication system capable of autonomously adjusting a base station parameter defining coverage according to load information exchanged between radio base stations, comprising a first radio base station and a second radio base station, wherein the first radio base station comprises:
   a controller configured to request a first load information indicating a hardware load level of the second radio base station;
   a receiver configured to receive the first load information from the second radio base station:
   wherein the controller is further configured to compare the load level of the second radio base station indicated by the first load information to the load level of the first radio base station,
   a transmitter configured to transmit a transmission request for a second load information in response to a result of the comparison of the load level of the radio base station with the load level of the second radio base station indicated by the first load information, wherein the second load information is configured to have a larger information amount than the first load information;
   wherein the receiver is further configured to receive the second load information from the second radio base station after the transmitter transmits the transmission request for the second load information;
   and wherein the controller is configured to control to reduce coverage of the first radio base station by adjusting the base station parameter based on the second load information received by the receiver.

5. A control method for a radio base station used in a radio communication system capable of autonomously adjusting a base station parameter defining coverage according to load information exchanged between radio base stations, comprising the steps of:
   requesting, by a radio base station, a first load information indicating a hardware load level of a different radio base station;
   receiving, by the radio base station, the first load information from the different radio base station:
   comparing, by the radio base station, the load level of the different radio base station indicated by the first load information to the load level of the radio base station,
   transmitting, by the radio base station, a transmission request for a second load information in response to a result of the comparison of the load level of the radio base station with the load level of the different radio base station indicated by the first load information, wherein the second load information is configured to have a larger information amount than the first load information;
   receiving, by the radio base station, the second load information from the different radio base station after the transmitter transmits the transmission request for the second load information;
   and reducing, by the radio base station, coverage of the radio base station by adjusting the base station parameter based on the second load information.

* * * * *